United States Patent [19]
Kadar

[11] Patent Number: 4,931,868
[45] Date of Patent: Jun. 5, 1990

[54] METHOD AND APPARATUS FOR DETECTING INNOVATIONS IN A SCENE

[75] Inventor: Ivan Kadar, Flushing, N.Y.

[73] Assignee: Grumman Aerospace Corporation, Bethpage, N.Y.

[21] Appl. No.: 200,605

[22] Filed: May 31, 1988

[51] Int. Cl.[5] .......... H04N 7/18
[52] U.S. Cl. .......... 358/105; 358/125; 364/521
[58] Field of Search .......... 358/125, 135, 136, 126, 358/125; 364/518, 521, 554

[56] References Cited

U.S. PATENT DOCUMENTS

| | | | |
|---|---|---|---|
| 3,950,733 | 4/1976 | Cooper et al. | 364/900 |
| 4,044,243 | 8/1977 | Cooper et al. | 364/754 |
| 4,254,474 | 3/1981 | Cooper et al. | 364/900 |
| 4,326,259 | 4/1982 | Cooper et al. | 364/715.11 |
| 4,630,114 | 12/1986 | Bergmann et al. | 358/166 X |
| 4,661,853 | 4/1987 | Roeder et al. | 358/167 |
| 4,719,584 | 1/1988 | Rue et al. | 358/126 X |
| 4,760,445 | 7/1988 | Mijiyawa | 358/105 |

OTHER PUBLICATIONS

"Robust Tracking Novelty Filters Based on Linear Models", by Ivan Kadar, Proceedings of the IEEE First Annual International Conference on Neural Networks, Jun. 1987.

*Primary Examiner*—James J. Groody
*Assistant Examiner*—Victor R. Kostak
*Attorney, Agent, or Firm*—Scully, Scott, Murphy & Presser

[57] ABSTRACT

A method and apparatus for detecting innovations in a scene in an image of the type having a large array of pixels. The method comprises the step of generating a multitude of parallel signals representing the amount of light incident on a group of adjacent pixels (masks) and these signals may be considered as forming a n by one vector, Z, where n equals the number of pixels in the masks. L such groups of adjacent pixels or elementary masks are used to geometrically cover the entire image in parallel. The method further comprises the step of replicating the generating step a multitude of times to generate a multitude of Z vectors by taking multiple frames of observations of the image (scene). These Z vectors may be represented in the form $A_k$, where k equals 1,2,3, . . . , m, where m equals the number of replicates. Each of the $Z_k$ vectors are related to a vector $\beta_k$ of three parameters by a measurement equation in a linear model framework, i.e. $Z_k = D\beta_k + e_k$, where $e_k$ is an additive noise term. In one embodiment, a solution of the linear model yields the best estimates of the parameters $\hat{\beta}_k = D^t Z_k$, where $D^T$ is a three by four matrix, $\hat{\beta}_k$ is a three by one vector, and $Z_k$ is a four by one vector of the measurements. $\hat{\beta}_k$ includes three components $u_k$, $A_k$ and $\beta_k$. The values of $u_k$, $A_k$, and $B_k$ are monitored over time, and a signal is generated whenever any one of these variables rises above a respective preset level.

19 Claims, 5 Drawing Sheets

METHOD AND APPARATUS FOR DETECTING INNOVATIONS IN A SCENE

BACKGROUND OF THE INVENTION

This invention generally relates to methods and apparatus for detecting innovations, such as changes or movement, in a scene or view, and more particularly, to using associative memory formalisms to detect such innovations.

In many situations, an observer is only interested in detecting or tracking changes in a scene, without having any special interest, at least initially, in learning exactly what that change is. For example, there may be an area in which under certain circumstances, no one should be, and an observer may monitor that area to detect any movement in or across that area. At least initially, that observer is not interested in learning what is moving across that area, but only in the fact that there is such movement in an area where there should be none.

Various automatic or semiautomatic techniques or procedures may be employed to perform this monitoring. For instance, pictures of the area may be taken continuously and compared to a "standard picture," and any differences between the taken pictures and that standard picture indicate a change of some sort in the area. Alternatively, one could subtract adjacent frames of a time sequence of pictures taken of the same scene in order to observe gray level changes. It is assumed herein that the sampling rate, i.e. the frame rate, is selected fast enough to capture any sudden change or motion (i.e. "innovations" or "novelty"). This mechanization would not require knowledge of a "standard picture". More particularly, each picture may be divided into a very large number of very small areas (picture elements) referred to as pixels, and each pixel of each taken picture may be compared to the corresponding pixel of the standard or adjacent frame picture. The division of a picture containing the scene into a larger number of pixels can be accomplished by a flying spot scanner or by an array of photodetectors/photosensors as well known to those versed in the art. The resultant light intensity of the discretized picture or image of the scene can be left as analog currents or voltages or can be digitized into a number of intensity levels if desired. We will refer to the photodetector/photosensor output current or voltage signal as the input signal to the apparatus described herein. Whether the input signal is a current or voltage depends on the source impedance of the photodetector/photosensor as well known to those versed in the art. This may be done, for example, by using photosensors to generate currents (or voltages) proportional to the amount of light incident on the pixels, and comparing these currents to currents generated in a similar fashion from the amount of light incident on the pixels of the standard scene. These comparisons may be done electronically, allowing a relatively rapid comparison. Even so, the very large number of required comparisons is quite large, even for a relatively small scene. Because of this, these standard techniques require a very large amount of memory and are still comparatively slow. Furthermore, changes in the scene can be caused not only by gray level differences but also by innovations or novelty (changes) in the texture of the scene. In such cases the method of reference comparisons or subtracting adjacent frames would not work. Hence, these prior art arrangements do not effectively detect changes in the texture of a scene.

SUMMARY OF THE INVENTION

An object of this invention is to provide a method and apparatus to detect innovations in a scene, which can be operated relatively quickly and which does not require a large memory capacity.

Another object of the present invention is to employ a recursive procedure, and apparatus to carry out that procedure, to detect innovations in a scene.

A still further object of this invention is to provide a process, which may be automatically performed on high speed electronic data processing equipment, that will effectively detect innovations in either gray level or the texture of a scene.

These and other objects are attained with a method for detecting innovations in a scene in an image array divided into a multititude of $M \times N$ pixels. Each pixel is assumed to be small enough to resolve the smallest detail to be resolved (detected) by the apparatus described herein. The method comprises the step of generating input signal vectors Z, with each component of Z being a pixel obtained from an ordered elementary grouping of said $2 \times 2$ adjacent pixels at a time (referred to as a $2 \times 2$ elementary mask operator or neighborhood by those versed in the art). Thus the components of Z are strung-out mask elements and form, in general, a n by one vector. Typically, $n=4$, and thus Z is a four by one vector. The method may further assume that the elementary mask operators geometrically cover the image containing the scene. For an $M \times N$ pixel image there are $$L = \frac{M \times N}{n}$$

elementary mask values neighborhoods or operations. If $M=N=256$ and $n=4$ then $L=16{,}384$. In this manner by observing all L mask neighborhoods simultaneously in parallel one can detect innovations anywhere in the image (scene).

The method further comprises the step of generating replicates of Z from multiple frames of observations of the scene (image) forming a set of Z vectors. These Z vectors are represented in the form $Z_k$, $k=1,2,3,\ldots,m$, where m equals the number of replicates (frames). Each of the $Z_k$ vectors are related to a vector $\beta_k$ of three parameters by a measurement equation in a linear model framework, i.e. $Z_k D \beta_k + e_k$, where $e_k$ *is* an additive noise term. A solution of the linear model yields the best estimates of the parameters $\beta_k = D^T Z_k$, where $D^T$ is a three by four matrix, $\beta_k$ is a three by one vector and $Z_k$ is a four by one vector of the measurements. $\beta_k$ includes three components $u_k$, $A_k$ and $B_k$. The values of $u_k$, $A_k$, and $B_k$ are monitored over time, and a signal is generated whenever any one of these variables rises above a respective preset threshold level.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

I have discovered that the output signals from an image pixel array detector elements representing a scene under consideration can be expressed in terms of a selected group of variables in a mathematical equation having a form identical to the form of an equation used in a branch of mathematics referred to as associative mapping. I have further discovered that techniques used to solve the latter equation can also be used to solve the former equation for those selected variables, and that changes in these variables over time identify innovations in the scene.

Figure 2:
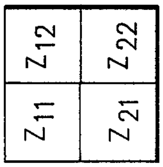
FIG. 2 shows a two by two group of pixels (a two by two elementary mask) of one of the observation frames.
Figure 1:
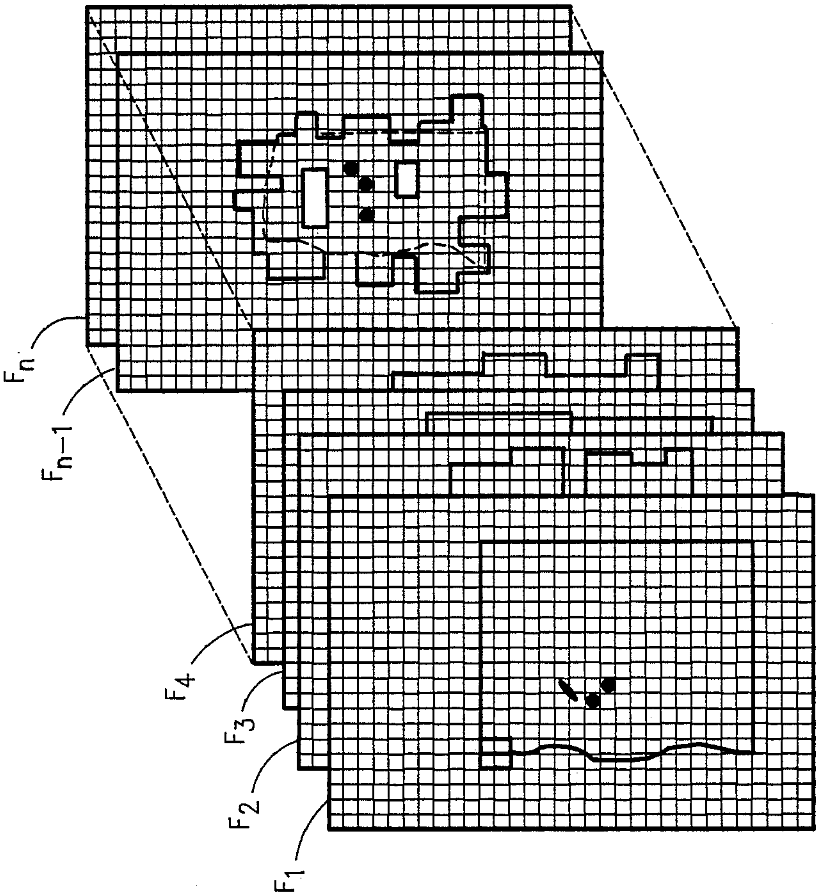
FIG. 1 illustrates a general $M \times N$ pixel image or detector array of observations of frames of a scene, taken over a period of time and generally outlining how that scene may change.

FIG. 1 illustrates a series of observation frames $F_1$-$F_n$ taken over a period of time. Each frame comprises an array of pixels, and FIG. 2 shows a two-by-two mask neighborhood from frame $F_1$. Generally, a pixel is identified by the symbol $z_{ij}$, where i identifies the row of the pixel in the frame, and j identifies the column of the pixel in the frame. Thus, for example, the four pixels shown in FIG. 2 are identified as $z_{11}$, $z_{12}$, $z_{21}$, and $z_{22}$. Photosensors (not shown) may be used to generate currents proportional to the intensity of light incident on each pixel, and these currents (i.e. input signals described previously) may be represented, respectively, by the symbols $Z_{11}$, $Z_{12}$, $Z_{21}$ and $Z_{22}$. These current measurements can be used to form a four by one vector, $$Z = \begin{bmatrix} Z_{11} \\ Z_{12} \\ Z_{21} \\ Z_{22} \end{bmatrix} \quad (1)$$

The measurement vector Z can also be expressed in the form of a linear model in the following manner:

$$Z = D\beta + e \quad (2)$$

Where $\beta$ is a three by one parameter vector representing the current due to the light from the pixels from objects of interest, D is a four by three matrix, discussed below, and e is a four by one vector representing the current due to random fluctuations.

Figure 3:
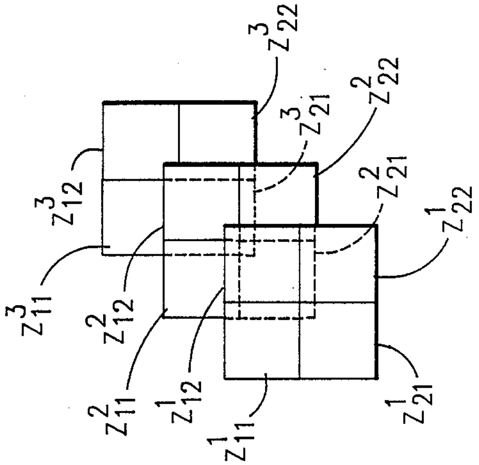
FIG. 3 shows a series of two-by-two pixels groups (masks) taken from a series of the observation frames.

Over time, a sequence of frames of a scene may be taken or developed, and FIG. 3 shows a series of 2×2 masks from frames $F_1$, $F_2$ and $F_3$. The symbol for each pixel within the mask is provided with a superscript, k, identifying the frame of the pixel; and thus the pixels from frame $F_1$ are identified in FIG. 3 as $z_{11}^1$, $z_{12}^1$, $z_{21}^1$ and $z_{22}^1$, and the pixels from frame $F_2$ are identified in FIG. 3 as $z_{11}^2$, $z_{12}^2$, $z_{21}^2$ and $z_{22}^2$. Photosensors may be used to generate currents representing the intensity of light incident on corresponding pixels of each frame as described previously; and if m frames are taken the current measurements from the pixels $z_{11}^k$, $z_{12}^k$, $z_{12}^k$ and $Z_{22}^k$ can be generally represented by $Z_{11}^k$, $Z_{12}^k$, $Z_{21}^k$ and $Z_{22}^k$, where k=1,2,3, . . . ,m. Equations (1) and (2) can be generalized respectively, as follows:

$$Z_k = \begin{bmatrix} Z_{11}^k \\ Z_{12}^k \\ Z_{21}^k \\ Z_{22}^k \end{bmatrix} \text{ where } k = 1,2,3,\ldots,m \quad (3)$$

$$Z_k = D\beta_k + e_k \text{ where } k = 1,2,3,\ldots,m. \quad (4)$$

It is known that, while equation (4) does not always possess a unique solution for $\beta_k$, an approximation to $\beta_k$, identified by the symbol $\beta_k$ can be determined by the method of least squares, given by the equation:

$$\beta_k = (D^TD)^{-1}D^TZ_k \quad (5)$$

Where $D^T$ is the transpose of D.

This nonrecursive method is based on the direct solution of the normal equations of an equivalent linear experimental design model. If D can be constructed as an orthogonal matrix, than $D^TD=1$, and equation (5) becomes $$\beta_k = D^TZ_k \quad (6)$$

Equation (6) has the same form as the equation:

$$y_k = Mx_k \text{ for all k in the set } (k=1,2,3,\ldots,m) \quad (7)$$

which is used in linear associative mapping to represent the fact that M is the matrix operator by which pattern $y_k$ is obtained from pattern $x_k$. If M is a novelty mapping, then M is always a balanced matrix, which means that all of the elements of M are either 1 or −1. If equation (6) is to correspond to equation (7), then D must also be balanced. Thus, D must have the following properties:

(i) it must be orthogonal, which means that $D^TD=c[I]$, where c is a scalar and I is the identity matrix.

(ii) every element of D must be 1, or −1, and (iii) it must have four rows and three columns in this example case.

The design matrix of certain classes of reparametrized linear models are found to satisfy the above criteria for novelty mappings by providing the required balanced properties of the matrix operator. For a class of randomized block fixed-effect two-way layout with n observations per cell experimental design, the corresponding reparametrized design matrix is both full rank and orthogonal. In this case, the association matrix can be prespecified by the model and becomes the transpose of the design matrix whose elements are +1 and −1.

I have found that one solution for D is:

$$D = \begin{bmatrix} 1 & 1 & 1 \\ 1 & 1 & -1 \\ 1 & -1 & 1 \\ 1 & -1 & -1 \end{bmatrix} \quad (8)$$

If, in equation (4), $\beta_k$ and $e_k$ are represented, respectively, by:

$$\beta_k = \begin{bmatrix} u_k \\ a_k \\ b_k \end{bmatrix} \quad (9)$$

$$e_k = \begin{bmatrix} e^k_{11} \\ e^k_{12} \\ e^k_{21} \\ e^k_{22} \end{bmatrix} \quad (10)$$

then equation (4) becomes:

$$Z_k = D \begin{bmatrix} u_k \\ a_k \\ b_k \end{bmatrix} + \begin{bmatrix} e^k_{11} \\ e^k_{12} \\ e^k_{21} \\ e^k_{22} \end{bmatrix} \quad (11)$$

Substituting the right-hand side of equation (8) for D in equation (Il) yields:

$$Z_k = \begin{bmatrix} 1 & 1 & 1 \\ 1 & 1 & -1 \\ 1 & -1 & 1 \\ 1 & -1 & -1 \end{bmatrix} \begin{bmatrix} u_k \\ a_k \\ b_k \end{bmatrix} + \begin{bmatrix} e^k_{11} \\ e^k_{12} \\ e^k_{21} \\ e^k_{22} \end{bmatrix} \quad (12)$$

Equation (6) can be solved for $u_k$ $A_k$ and $B_k$ as follows:

$$u_k = Z^k_{11} + Z^k_{12} + Z^k_{21} + Z^k_{22} \quad (13)$$
$$A_k = Z^k_{11} + Z^k_{12} - Z^k_{21} - Z^k_{22} \quad (14)$$
$$B_k = Z^k_{11} - Z^k_{12} + Z^k_{21} - Z^k_{22} \quad (15)$$

Figure 4:
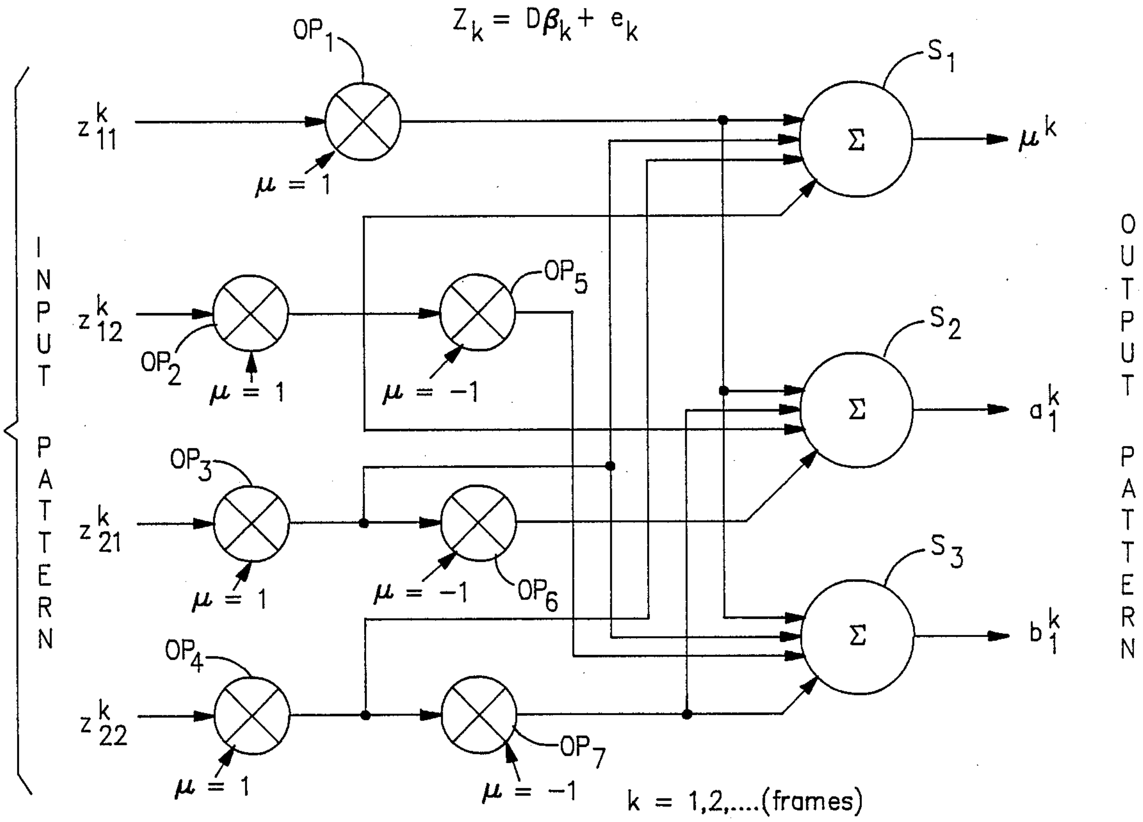
FIG. 4 schematically depicts one network in the form of a three-neuron neural network with constant weights for processing the signals from the group of pixels shown in FIG. 3.

FIG. 4 schematically depicts a logic array or network (which is in the form of a three-neuron neural network with constant weights) to process input signals according to equations (13), (14) and (15), and in particular, to produce output signals $u_k$, $A_k$ and $B_k$ from input signals $Z_{11}^k$, $Z_{12}^k$, $Z_{21}^k$ and $Z_{22}^k$. As previously mentioned, the input or output signals can represent either voltages or currents as appropriate.

Input signals $Z_{11}^k$, $Z_{23}^k$, $Z_{21}^k$ and $Z_{22}^k$ are conducted to multiply operators $OP_1$, $OP_2$, $OP_3$ and $OP_4$, respectively, and each of these operators is a unity operator. The output currents of these operators have values that are the same as the respective input signals $Z_{11}^k$, $Z_{12}^k$, $Z_{21}^k$ and $Z_{22}^k$, and these operators are shown in FIG. 4 to illustrate the fact that they apply a weighted value of +1 to input signals $Z_{11}$, $Z_{12}^k$, $Z_{21}^k$ and $Z_{22}^k$. The output of operators $OP_2$, $OP_3$ and $OP_4$ are applied, respectively, to operators $OP_5$, $OP_6$ and $OP_7$, which are signal inverters. Each of these latter three operators generates an output signal that is equal in magnitude, but opposite in polarity, to the input signal applied to the operator. Thus, the output of operator $OP_5$ has a magnitude equal to and a polarity opposite to the signal $Z_{12}^k$, the output of operator $OP_6$ has a magnitude equal to and a polarity opposite to the signal $Z_{21}^k$, and the output of operator $OP_7$ has a magnitude equal to and a polarity opposite to the signal $Z_{22}^k$.

The output of operator $OP_1$ is applied to an "a" input of each of a group of summing devices $S_1$, $S_2$ and $S_3$, the output of operator $OP_2$ is applied to a "d" input of summing device $S_1$ and to a "c" input of summing device $S_2$, the output of operator $OP_3$ is applied to a "b" input of each of the summing devices $S_1$ and $S_3$, and the output of operator $OP_4$ is applied to a "c" input of summing device $S_1$. The output of operator $OP_5$ is applied to a "c" input of summing device $S_3$, the output of operator $OP_6$ is applied to a "d" input of summing device $S_2$, and the output of operator $OP_7$ is applied to a "b" input of summing device $S_2$ and to a "d" input of summing device $S_3$. For the sake of clarity, the "a", "b", "c" and "d" inputs of summing devices $S_1$, $S_2$ and $S_3$ are not expressly referenced in FIG. 4.

Each summing device $S_1$, $S_2$ and $S_3$ generates an output signal equal to the sum of the signals applied to the inputs of the summing device. Thus:

$$\text{output of } S_1 = Z_{11}^k + Z_{21}^k + Z_{22}^k + Z_{12}^k \quad (16)$$

$$\text{output of } S_z = Z_{11}^k - Z_{22}^k + Z_{12}^k - Z_{21}^k \quad (17)$$

$$\text{output of } S_3 = Z_{11}^k + Z_{21}^k - Z_{12}^i - Z_{22}^k \quad (18)$$

As can be seen by comparing equations (13)–(15) with equations (16)–(18), the outputs of summing devices $S_1$, $S_2$ and $S_3$ respectively represent $u_k$, $A_k$ and $B_k$.

Another solution (recursive) for equation (4) can be derived by a technique called stochastic approximation minimum variance least squares (referred to as SAMVLS), and this technique provides the iterative equation:

$$\beta_{k+1} = \beta_k + \frac{A}{k} D^T [Z_k - D\beta_k] \quad (19)$$

$$k = 1,2,3 \ldots m$$

Where: an arbitrary value is chosen for $\beta_1$, and A is a selected matrix, referred to as the gain matrix. The gain matrix, A, controls the rate of convergence of the procedure along with the step size k. The gain matrix can also be made adaptive (a function of the input data sequence) by those versed in the art to keep the recursive estimation procedure convergence rate "near" optimum.

This iterative/corrective procedure realization is based on temporal data sequence novelty parameter estimation from the measurement equation of the linear model using robustized stochastic approximation algorithms requiring little storage.

Equation (19) is a recursive equation in that each $\beta_{k+1}$ is expressed in terms of the prior calculated $\beta_k$ value. Any arbitrary value is chosen for $\beta_1$, and so there will likely be an error for the first few calculated $\beta_k$ values. Any error, though, will decrease over time. Also, under most conditions, there is a known range for the value of $\beta_k$, and picking a $\beta_1$ within this range limits any error for the first few $\beta_k$ values calculated by means of equation (19). Indeed, a skilled individual will normally be able to provide a good approximation of $\beta_1$, so that any error in the subsequent $\beta_k$ values calculated by equation (19) may often be negligible.

Figure 5:
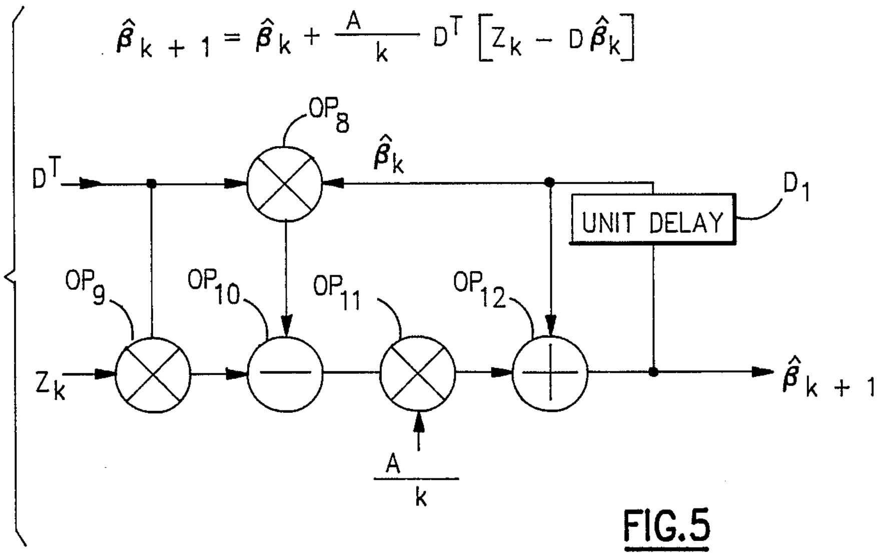
FIG. 5 schematically depicts another network to process the signals from the group of pixels shown in FIG. 3.

FIG. 5 schematically depicts a logic array or network to process input signals according to equation (19), and in particular, to produce the output vector $\beta_{k+1}$, from the input vectors $Z_k$ and $\beta_k$. For the sake of simplicity, FIG. 5 does not show the individual components of $Z_k$, $\beta_k$ or $\beta k+1$, nor does FIG. 5 show the individual operators representing the elements of matrix $D^T$ or A. These components and operators could easily be added by those of ordinary skill in the art to expand FIG. 5 to the level of detail shown in FIG. 4.

With the circuit shown in FIG. 5, a $\beta_k$ value is conducted to operator $OP_8$ which multiplies $\beta_k$ by the matrix $D^T$. At the same time, the measured signal values comprising $Z_k$ are conducted to operator $OP_9$, which multiplies $Z_k$ by the matrix $D^T$. The outputs of operators $OP_8$ and $OP_9$ are conducted to operator $OP_{10}$, which subtracts the former output from the latter output, and the difference between the outputs of operators $OP_8$ and $OP_9$ is conducted to operator $OP_{11}$, which multiplies that difference by the matrix A divided by k. The product produced at operator $OP_{11}$ is conducted to operator $OP_{12}$, where $\beta_k$ is added to that product to produce $\beta_{k+1}$. The value of $\beta_{k+1}$ is conducted both to an output of the network, and to delay means $D_1$, which simply holds that vector for a unit of time, corresponding to the iteration step, k.

The $\beta_k$ values calculated by using equation (19) are sensitive to all signal changes in the elementary mask unit, including changes that are of interest and changes that are not of interest, referred to as noise. To decrease the sensitivity of $\beta_k$ to noise, and ideally to make $\beta_k$ insensitive to noise, recursive estimation procedures based on robustized stochastic approximation may be incorporated into equation (19). By using a nonlinear regression function, the recursive estimator can be made robust, i.e. the output parameter estimates made insensitive to unwanted disturbances/changes in the measurement equation of the model. In particular, $W^b$, a symmetric form of the Mann-Whitney-Wilcoxon nonparametric statistic based b-batch, nonlinear robustizing transformation may be added to equation (19).

More specifically, $$w^b = \frac{1}{b^2} \sum_{i=1}^{b} \sum_{j=1}^{b} sgn\,(r_i - s_j) \tag{20}$$

where r and s each is a set consisting of b sample measurements; and sign is an operator which is equal to +1 if $r_i - s_j$ is greater than 0, equal to 0 if $r_i - s_j$ equals zero, and equal to −1 if $r_i - s_j$ is less than 0.

For example, assume that a total of eight sample measurements are taken, producing values 4, 2, 6, 1, 5, 4, 3 and 7. These sample measurements may be grouped into the r and s sets as follows $$r = \{4, 2, 6, 1\} \tag{21}$$

$$s = \{5, 4, 3, 7\} \tag{22}$$

$W^b$ can be calculated as follows:

$$w^b = \frac{1}{4^2}\left[\sum_{j=1}^{b} sgn\,(4 - s_j) + \sum_{j=1}^{b} sgn\,(2 - s_j) + \sum_{j=1}^{b} sgn\,(6 - s_j) + \sum_{j=1}^{b} sgn\,(1 - s_j)\right] \tag{23}$$

$$w^b = \frac{1}{16}[sgn\,(4-5) + sgn\,(4-4) + sgn\,(4-3) + sgn\,(4-7) + sgn\,(2-5) + sgn\,(2-4) + sgn\,(2-3) + sgn\,(2-7) + sgn\,(6-5) + sgn\,(6-4) + sgn\,(6-3) + sgn\,(6-7) + sgn\,(1-5) + sgn\,(1-4) + sgn\,(1-3) + sgn\,(1-7)] \tag{24}$$

$$w^b = \frac{1}{16}[-1 + 0 - 1 + 1 - 1 - 1 - 1 - 1 + 1 + 1 - 1 - 1 - 1 - 1 - 1] \tag{25}$$

$$w^b = \frac{1}{16}[-8] = -\tfrac{1}{2}$$

We note that in general, $$\max w^b = +1$$

$$\min w^b = -1 \tag{26}$$

thus $w^b$ has been normalized to ±1.

Figure 6:
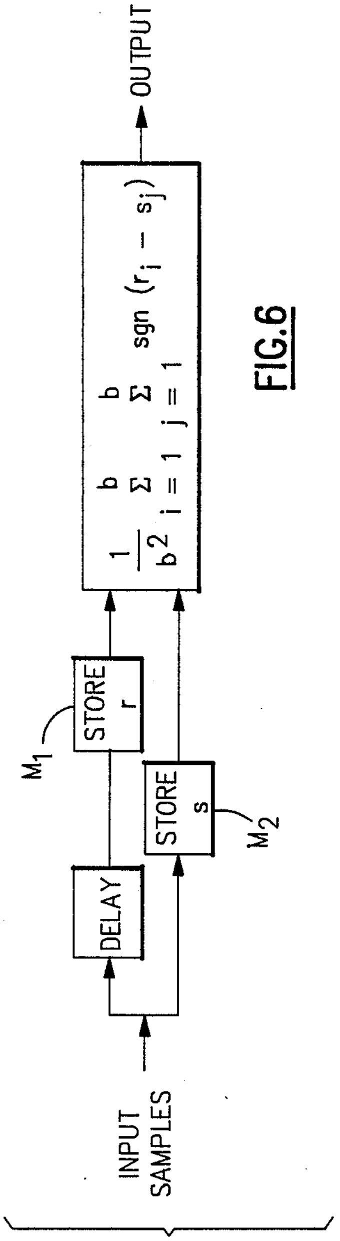
FIG. 6 schematically depicts a procedure to calculate a robustizing factor that may be used in the present invention.

FIG. 6 schematically illustrates this procedure to calculate $W^b$. A set of b sample values is stored in memory $M_1$, a different set of b sample values is stored in memory $M_2$, and then $W^b$ is calculated by means of equation (20).

Various other procedures are known for calculating the robustizing factor $W^b$, and any suitable techniques may be used in the practice of this embodiment of the invention.

The $W^b$ factor is introduced into equation (19) as follows:

$$\beta_{x+1} = \beta_k - \frac{A}{k} w^b (q_i) \tag{27}$$

Where $$q_i = D^T [Z_{k'+1} - D\beta_k] \tag{28}$$

Where i equals 1, 2, 3, . . . ,b, and k'=b(k−1).

A is the gain matrix and selected to achieve a near optimum convergence rate for the procedure. One value for A which I have determined is given by the equation $$A = \begin{bmatrix} \tfrac{1}{2}00 \\ 0\tfrac{1}{2}0 \\ 00\tfrac{1}{2} \end{bmatrix} \tag{29}$$

A time dependent adaptive gain matrix $A_k(.)$ could also be used in equation (27) to provide a faster approximation to $\beta_{k+1}$, although for most purposes, a fixed A value provides sufficient convergence rate. Numerous techniques are known by those of ordinary skill in the art to determine a time dependent adaptive gain matrix, and any suitable such technique may be used in the practice of this embodiment of the invention.

Figure 7:
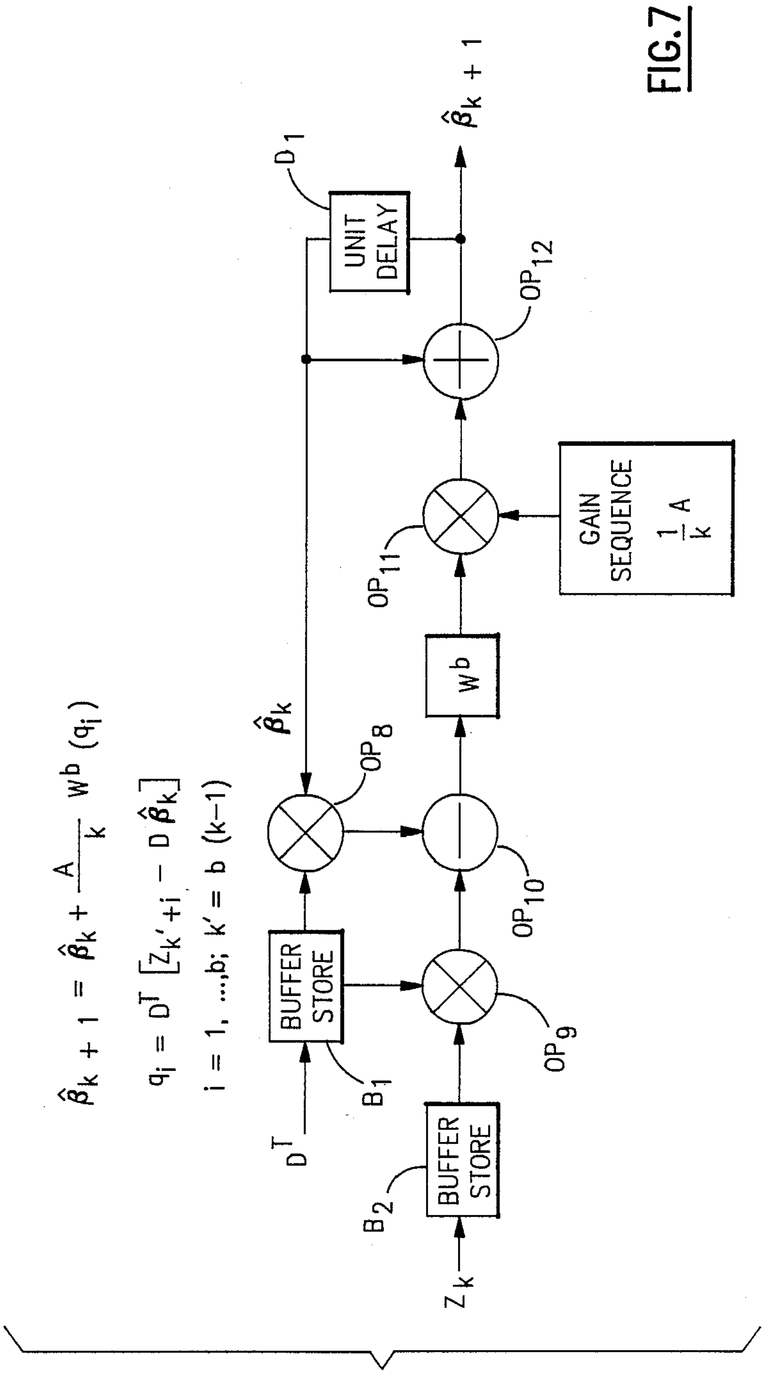
FIG. 7 schematically depicts a network similar to the array represented in FIG. 5, but also including a noise attenuating robustizing factor.

FIG. 7 schematically illustrates a network or array to process input signals according to equation (27). As can be seen by comparing FIGS. 7 and 5, the robustizing of equation (19) requires the addition to the circuit of FIG. 5 of two buffer units $B_1$ and $B_2$, and the matrix operator $W^b$. The first m values of $Z_k$ are stored in buffers $B_1$ an $B_2$, an arbitrary is provided to operator $OP_8$, and the vector is operated on by matrix $D^T$. At the same time, the vector $Z_k$ is operated on by the matrix $D^T$ at operator $OP_9$. The output of operators $OP_8$ and $OP_9$ are conducted to operator $OP_{10}$, where the former is subtracted from the latter. This difference is then multiplied by $W^b$, and this result is operated on by the gain matrix A at operator $OP_{11}$. The output matrix from operator $OP_{11}$ is added to $\beta_k$ at operator $OP_{12}$ to derive $\beta_{k+1}$. This value is conducted both to the output of the network, and to unit delay means $D_1$, which holds that value of $\beta_{k+1}$ for a time unit, until the network is used to calculate the next $\beta_k$ value.

In effect, $W^b$ is a data dependent adaptive nonlinear attenuation factor, formed by summing and limiting selected measured values, and the introduction of this factor is designed to eliminate false alarms caused by increases in noise-like disturbances. The values taken to form $W^b$ are selected, not on the basis of their absolute magnitude, but rather on the basis of their value relative to the immediately preceding and immediately following measured values.

Figure 8:
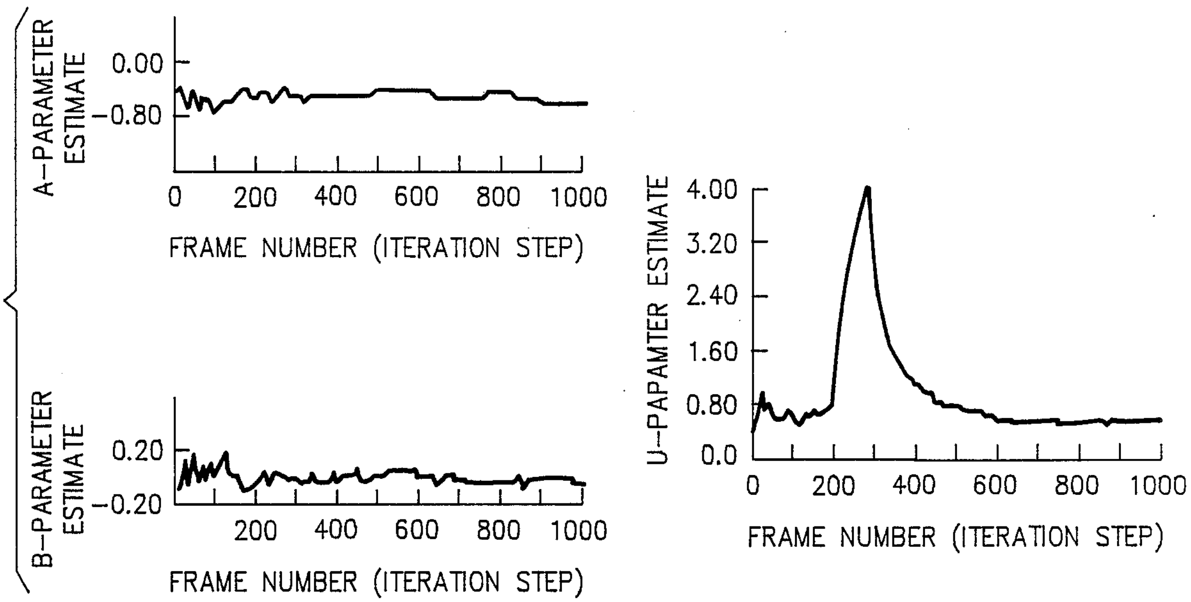
FIG. 8 comprises three graphs showing how three variables obtained by processing signals from a (2×2) mask change as an object moves diagonally from one pixel to another pixel.

FIG. 8 shows the output values for $u_k$, $A_k$ and $B_k$ for the situation where an object moves from one pixel, such as pixel $Z_{11}$, to a diagonal pixel, such as pixel $Z_{22}$. As can be seen, such movement is clearly indicated by a spike in u, and the parameters A and B do not show any significant change.

Figure 9:
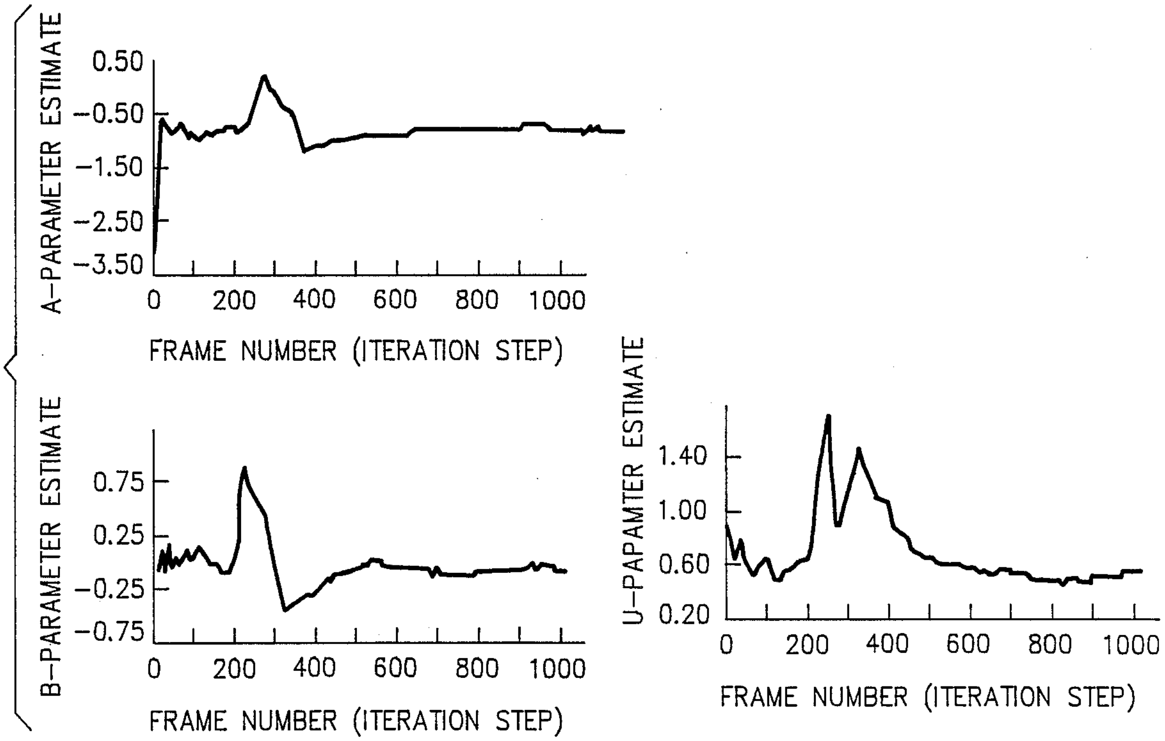
FIG. 9 comprises three graphs showing how the three variables obtained by processing signals from a (2×2) mask change as an object moves either vertically or horizontally from one pixel to another adjacent pixel within the 2×2 mask.

FIG. 9 shows the output signals $u_k$, $A_k$ and $B_k$ during movement of an object from one pixel to an adjacent pixel, such as from pixel $Z_{11}$ to pixel $Z_{21}$. As can be seen, this movement results in spikes in the value of all three parameters, and in fact this change produces a double spike in the value of u.

Thus, movement of an object across pixels $z_{11}$, $z_{12}$, $z_{21}$ and $z_{22}$ can be automatically detected by, for example, providing first, second and third threshold detectors to sense the output of summing devices $S_1$, $S_2$ and $S_3$, respectively, of FIG. 4 and to generate respective signals whenever the level of the output of any one of the summing devices rises above a respective preset level. As will be understood by those of ordinary skill in the art, these movement indication signals may be, and preferably are, in the form of electric current or voltage pulses, forms that are very well suited for use with electronic data processing equipment such as computers and microprocessors. Moreover, the present invention is effective to detect changes in the texture of a scene—which is the result of changes in the light intensity of individual pixel groups—even if there is no actual movement of an object across the scene.

Figure 10:
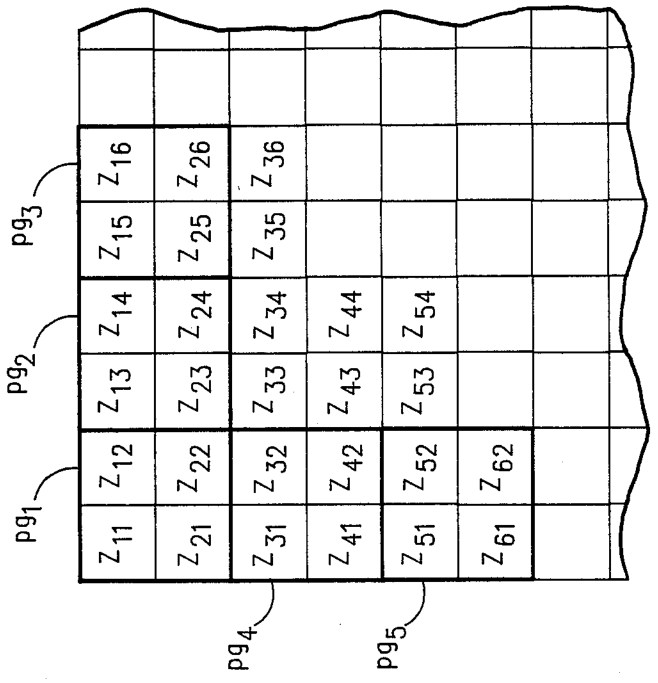
FIG. 10 shows an array of 2×2 masks at one observation fame.

A scene, of course, normally includes many more than just four pixels, and movement across a scene as a whole can be tracked by covering the scene by a multitude of elementary mask operators, and automatically monitoring the movement indication signals of the individual mask operators, a technique referred to as massive parallelism. For example, with reference to FIG. 10, a movement indication signal from pixel group $pg_1$ followed by movement indication signals from pixel groups $pg_2$ and $pg_3$ indicate horizontal movement across the scene. Analogously, a movement indication signal from pixel group $pg_1$ followed by movement indication signals from pixel groups $pg_4$ and $pg_5$ indicate vertical movement across the scene.

Figure 11:
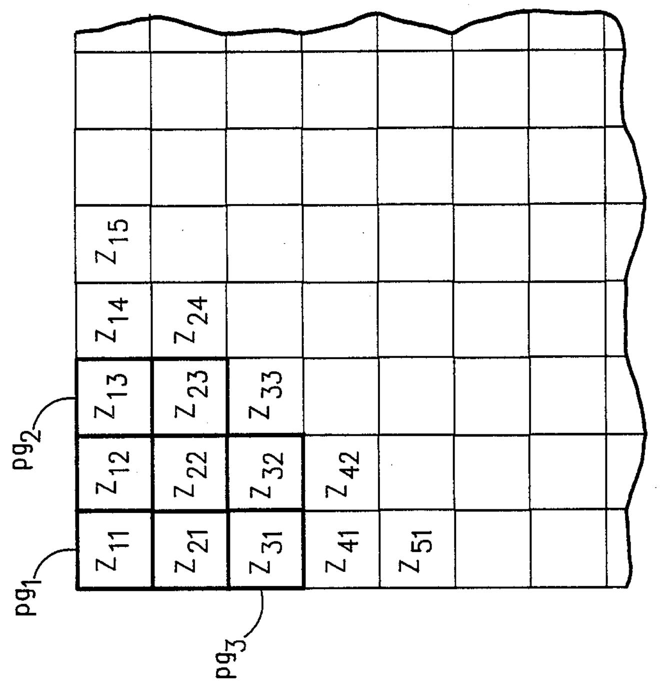
FIG. 11 shows an array of overlapping 2×2 masks of an observation frame.

A more precise tracking of an object across a scene can be obtained by overlapping the pixel groups For instance, with reference to FIG. 11, pixel group $pg_1$ can be formed from pixels $z_{11}$, $z_{12}$, $z_{21}$ and $z_{22}$; pixel group $pg_2$ can be formed from pixels $z_{12}$, $z_{13}$, $z_{22}$ and $z_{23}$; and pixel group $pg_3$ can be formed from pixels z , $z_{22}$, z31 and $z_{32}$. Movement indication signals from pixel groups $pg_1$ and $pg_3$, coupled with no movement indication signals from pixel group $pg_2$, indicate movement of an object between pixels $z_{11}$ and $z_{21}$. Analogously, movement indication signals from pixel groups pg and $pg_2$, in combination with no movement indication signal from pixel group $pg_3$, indicate movement between pixels $z_{11}$ and $z_{12}$.

In addition to detecting the presence of innovations and direction of movement, one can also determine the speed (and velocity given the direction of motion) of an object. This can be accomplished by computing the dwell time of an object within a mask. The dwell time depends on the object speed, S, the frame rate $R=1/T$, where T is the frame time, the pixel size and the mask size. If each pixel within an elementary 2×2 mask is a by a units wide, then the speed of an object moving diagonally is given by $$S = \frac{4\sqrt{2}\,aL}{T} \tag{30}$$

where L is the number of masks in the frame.

The networks illustrated in FIGS. 4, 5 and 7 are similar in many respects to neural networks as mentioned before. A multitude of data values are sensed or otherwise obtained, each of these values is given a weight, and the weighted data values are summed according to a previously determined formula to produce a decision.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed:

1. A method for detecting innovations in a scene comprising an array of pixels, the method comprising the steps of:

generating at each of a multitude of times, a set of input signals representing the amount of light incident on a group of adjacent pixels, each set of input signals forming an n by one vector, where n equals the number of signals in the set, the sets of input signals being represented by $Z_k$, where $k=1, 2, 3, \ldots, m$, and m equals the number of said input sets;

conducting the sets of input signals to a processing network;

the processing network transforming each set of input signals to a respective one set of output signals, the sets of output signals being represented by $\beta_k$, wherein $Z_k$ and $Z_k$ satisfy the relation $Z_k = D\beta_k + e_k$, where D is an at least four by an at least three matrix, and $e_k$ represents noise in the set of signals $Z_k$;

conducting the sets of output signals to a detection means; and the detection means, (i) sensing the magnitude of at least one signal of each set of output signals, and (ii) generating a detection signal to indicate a change in the scene when said one signal rises above a respective one preset level.

2. A method according to claim 1 wherein the group of pixels form a rectangle in the scene.

3. A method according to claim 2, wherein: the group of adjacent pixels includes four pixels; and $$D = \begin{bmatrix} 1 & 1 & 1 \\ 1 & 1 & -1 \\ 1 & -1 & 1 \\ 1 & -1 & -1 \end{bmatrix}.$$

4. A method according to claim 3, wherein the group of pixels form a square in the scene.

5. A method according to claim 1, wherein the transforming step includes the step of obtaining an approximation of $\beta_k$, given by the symbol $\beta_k$, by means of the equation:

$$\beta_k = D^t Z_k$$

where $D^T$ is the transpose of D.

6. A method according to claim 1, wherein the transforming step includes the step of obtaining an approximation of $\beta_k$, given by the symbol $\beta_k$, by means of the equation:

$$\beta_{k+1} = \beta_k + \frac{A}{k} D^T [Z_k - D\beta_k]$$

where A is an at least three by at least three matrix, and $D^T$ is the transpose of D.

7. A method according to claim 6, where $$D = \begin{bmatrix} 1 & 1 & 1 \\ 1 & 1 & -1 \\ 1 & -1 & 1 \\ 1 & -1 & -1 \end{bmatrix}.$$

8. A method according to claim 1, wherein the obtaining step includes the step of obtaining an approximation of $\beta_k$, given by the symbol $\beta_k$, by means of the equation:

$$\beta_{k+1} = \beta_k + \frac{A}{k} W^b (q_i)$$

where, $q_i D^T [Z_{k+1} - D\beta_k]$, $W^b$ is a data dependent noise attentuation factor derived from two groups of data samples, each sample having b data values, $i = 1, 2, 3 \ldots b$, $k^1 = b(k-1)$ A is an at least three by an at least three gain matrix.

9. Apparatus according to claim 1, wherein the group of pixels form a rectangle in the scene.

10. Apparatus according to claim 9, wherein: the group of adjacent pixels includes four pixels; and $$D = \begin{bmatrix} 1 & 1 & 1 \\ 1 & 1 & -1 \\ 1 & -1 & 1 \\ 1 & -1 & -1 \end{bmatrix}.$$

11. Apparatus according to claim 10, wherein the group of pixels form a square in the scene.

12. Apparatus according to claim 1, wherein:

the source means includes voltage generating means to generate voltage potentials representing the amount of light incident on the pixels; and the processing network is connected to the voltage generating means to receive the voltage potentials therefrom, and to generate from each group of voltage potentials, $Z_k$, at least one output signal representing the $\beta_k$ vector associated with said $Z_k$ vector.

13. Apparatus according to claim 12, wherein:

the processing network includes first, second, third and fourth input means; first, second and third voltage inverters; and first, second and third summing devices;

the voltage generating means generates first, second, third and fourth voltage signals representing the amount of light incident on first, second, third and fourth of the pixels respectively;

the first, second, third and fourth input means of the processing network are connected to the voltage generating means, respectively, to receive the first, second, third and fourth electric voltage potentials from the voltage generating means;

the first inverter is connected to the second input means to generate a first internal voltage signal having a polarity opposite to the polarity of the second input means;

the second inverter is connected to the third input means to generate a second internal voltage signal having a polarity opposite to the polarity of the third input means;

the third inverter is connected to the fourth input means to generate a third internal voltage signal having a polarity opposite to the polarity of the fourth input means;

the first summing means is connected to the first, second, third and fourth input means and generates an output signal having a voltage equal to the sum of the voltages of the first, second, third and fourth input means;

the second summing means is connected to the first and second input means and to the second and third inverters to generate an output signal having a voltage equal to the sum of the voltages of the first and second input means and the second and third inverters; and the third summing means is connected to the first and third input means and the first and third inverters to generate an output signal having a voltage equal to the sum of the voltages of the first and third input means and the first and third inverters.

14. A method according to claim 1, wherein the input signals representing the amount of light on the pixels are electric voltage signals.

15. A method according to claim 14, wherein:

the step of generating the signals representing the amount of light incident on the group of pixels includes the step of, for each set of input signals, generating at least first, second, third and fourth electric voltage signals respectively representing the amount of light incident on at least first, second, third and fourth of the group of pixels;

the transforming step includes the steps of, for each set of input signals conducted to the processing network, (i) summing the first, second, third and fourth voltage signals, and generating a first output signal proportional to the sum of said first, second, third and fourth voltage signals, (ii) summing the first and second voltage signals and the negatives of the third and fourth voltage signals, and generating a second output signal proportional to the sum of said first and second voltage signals and the negatives of the third and fourth voltage signals, and (iii) summing the first and third voltage signals and the negatives of the second and fourth voltage signals, and generating a third output signal proportional to the sum of the first and third voltage signals and the negatives of the second and fourth voltage signals; and the sensing step includes the step of sensing the magnitude of one of the first, second and third output signals of each set of output signals.

16. A method according to claim 15, wherein the network includes first, second, third and fourth input means; first, second and third voltage inverters, and first, second and third summing devices, and wherein:

the conducting step includes the steps of applying the first, second, third and fourth voltage signals respectively to the first, second, third and fourth input means of the network;

the transforming step further includes the steps of (i) applying the voltage of the second input means to the first inverter to generate a first internal voltage signal having a polarity opposite to the polarity of the second input means, (ii) applying the voltage of the third input means to the second inverter to generate a second internal voltage signal having a polarity opposite to the polarity of the third input means, and (iii) applying the voltage of the fourth input means to the third inverter to generate a third internal voltage signal having a polarity opposite to the polarity of the fourth input means;

the step of summing the first, second, third and fourth voltage signals includes the step of applying to the first summing device, the voltages of the first, second, third and fourth input means;

the step of summing the first and second voltage signals and the negatives of the third and fourth voltage signals includes the step of applying to the second summing device, the voltages of the first and second input means and the voltages of the second and third internal voltage signals; and the step of summing the first and third voltage signals and the negatives of the second and fourth voltage signals includes the step of applying to the third summing device the voltages of the first and third input means and the voltages of the second and third internal voltage signals.

17. A method according to claim 1, wherein:

each set of output signals includes first, second and third output signals;

the first output signals of the sets of output signals rise above a given value when an object moves across the scene in a given direction;

the sensing step includes the step of sensing the first output signal of each set of output signals; and the step of generating the detection signal includes the step of generating the detection signal when the first output signal rises above the given value to indicate motion of the object across the scene in the given direction.

18. A method according to claim 1, wherein:

each set of output signals include first, second and third output signals;

the first, second and third output signals each rise above a respective given value when an object moves across the scene in a given direction;

the sensing step includes the step of sensing the first, second and third output signals of each set of output signals; and the step of generating the detection signal includes the step of generating the detection signal when all of the first, second and third output signals rise above the respective given values to indicate motion of the object across the scene in the given direction.

19. Apparatus for detecting innovations in a scene including an array of pixels, the apparatus comprising:

source means to generate at each of a multitude of times, a set of input signals representing the amount of light incident on a set of adjacent pixels, each set of input signals forming an n by one vector, where n equals the number of signals in the set, the sets of input signals being represented by $Z_k$, where $k=1, 2, 3, \ldots, m$, and m equals the number of said input sets;

a processing network coupled to said source means to receive said sets of input signals therefrom, and to transform each set of input signals to a respective one set of output signals, the sets of output signals being represented by $\beta_k$, wherein $Z_k$ and $\beta_k$ satisfy the relation $Z_k=D\beta_k+e_k$, where D is an at least four by an at least three matrix, and $e_k$ represents noise in the set of signals $Z_k$; and detection means coupled to said processing network to receive said sets of output signals therefrom, to sense the magnitude of at least one signal of each set of output signals, and to generate a detection signal to indicate a change in the scene when said one signal rises above a respective one present level.

* * * * *

UNITED STATES PATENT AND TRADEMARK OFFICE

CERTIFICATE OF CORRECTION

PATENT NO. : 4,931,868
DATED : June 5, 1990
INVENTOR(S) : Ivan Kadar

It is certified that error appears in the above-identified patent and that said Letters Patent is hereby corrected as shown below:

ON TITLE PAGE:

In the Abstract, Line 14, "$A_k$" should read as --$Z_k$--.

Column 2, Lines 53 and 54, in both occurrences, "$\beta_k$" should read as --$\hat{\beta}_k$--.

Column 4, Line 22, "$z_{12}^k$" should read as --$z_{21}^k$--.

Column 4, Line 23, "$Z_{22}^k$" should read as --$z_{22}^k$--.

Column 4, Lines 39, 42 and 50, "$\beta_k$" should read as --$\hat{\beta}_k$--.

Column 5, Line 46, "(I1)" should read as --(11)--.

Column 6, Line 3, "$Z_{23}^k$" should read as --$Z_{12}^k$--.

Column 6, Line 10, "$Z_{11}$" should read as --$Z_{11}^k$--.

Column 6, Line 45, "$Z_{12}^1$" should read as --$Z_{12}^k$--.

Column 6, Line 58, in all occurrences, "$\beta_k$" should read as --$\hat{\beta}_k$--.

Column 6, Line 61, "$\beta_1$" should read as --$\hat{\beta}_1$--.

Column 7, in all occurrences (21 occurrences), "$\beta$" should read as --$\hat{\beta}$--.

Column 7, Line 23, "$\hat{\beta}$k+1" should read as --$\hat{\beta}_{k+1}$--.

Column 7, Line 66, "sign" should read as --sgn--.

Column 8, Lines 53 and 56, in all occurrences, "$\beta$" should read as --$\hat{\beta}$--.

Column 9, Line 3, "$\beta_{k+}$1" should read as --$\hat{\beta}_{k+1}$--.

UNITED STATES PATENT AND TRADEMARK OFFICE
CERTIFICATE OF CORRECTION

PATENT NO. : 4,931,868
DATED : June 5, 1990
INVENTOR(S) : Ivan Kadar

It is certified that error appears in the above-identified patent and that said Letters Patent is hereby corrected as shown below:

Column 9, Line 15, after "arbitrary" insert --$\hat{\beta}_1$--.

Column 9, Line 16, before "vector" insert --$\hat{\beta}_1$--.

Column 9, Lines 23, 24, 26 and 27, in each occurrence, "ß" should read as --$\hat{\beta}$--.

Column 10, Line 13, "groups" should read as --groups.--.

Column 10, Line 17, "z, $z_{22}$, z31" should read as --$z_{21}$, $z_{22}$, $z_{31}$--.

Column 10, Line 22, "pg" first occurrence, should read as --$pg_1$--.

Column 11, Line 4, Claim 1, "$Z_k$ satisfy" should read as --$\beta_k$ satisfy--.

UNITED STATES PATENT AND TRADEMARK OFFICE
CERTIFICATE OF CORRECTION

PATENT NO. : 4,931,868

DATED : June 5, 1990

INVENTOR(S) : Ivan Kadar

It is certified that error appears in the above-identified patent and that said Letters Patent is hereby corrected as shown below:

Column 11, Line 58, (2nd occur.) and line 62, claim 8 "$\beta_k$" should read as --$\hat{\beta}_k$--.

Column, 11, Line 65, Claim 8, "$q_i D^T[Z_{k+1}-D\beta_k]$" should read as --$q_i=D^T[Z_{k+1}-D\hat{\beta}_k]$--.

Column 11, Line 66, Claim 8, "attentuation" should read as --attenuation--.

Signed and Sealed this

Fifth Day of November, 1991

*Attest:*

HARRY F. MANBECK, JR.

*Attesting Officer* *Commissioner of Patents and Trademarks*